US 6,745,364 B2

(12) United States Patent
Bhatt et al.

(10) Patent No.: US 6,745,364 B2
(45) Date of Patent: Jun. 1, 2004

(54) NEGOTIATED/DYNAMIC ERROR CORRECTION FOR STREAMED MEDIA

(75) Inventors: Sanjay Bhatt, Redmond, WA (US); Richard Machin, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 524 days.

(21) Appl. No.: 09/896,901

(22) Filed: Jun. 28, 2001

(65) Prior Publication Data

US 2003/0005386 A1 Jan. 2, 2003

(51) Int. Cl.[7] .............................................. H03M 13/35
(52) U.S. Cl. ........................................ 714/774; 709/231
(58) Field of Search ........................... 714/776; 709/231

(56) References Cited

U.S. PATENT DOCUMENTS

| | | | | |
|---|---|---|---|---|
| 5,768,527 A | * | 6/1998 | Zhu et al. ..................... | 709/231 |
| 6,141,788 A | | 10/2000 | Rosenberg et al. ......... | 714/774 |
| 6,167,060 A | * | 12/2000 | Vargo et al. ................ | 370/468 |
| 6,421,387 B1 | * | 7/2002 | Rhee ...................... | 375/240.27 |
| 6,434,191 B1 | * | 8/2002 | Agrawal et al. ............ | 375/227 |
| 6,445,717 B1 | * | 9/2002 | Gibson et al. .............. | 370/473 |
| 6,473,875 B1 | * | 10/2002 | Anderson .................... | 714/746 |
| 6,487,690 B1 | * | 11/2002 | Schuster et al. ............ | 714/752 |
| 6,490,705 B1 | * | 12/2002 | Boyce ........................ | 714/776 |
| 6,532,562 B1 | * | 3/2003 | Chou et al. ................. | 714/746 |
| 6,556,588 B2 | * | 4/2003 | Wan et al. .................. | 370/474 |

* cited by examiner

Primary Examiner—Stephen M. Baker
(74) Attorney, Agent, or Firm—Lee & Hayes, PLLC

(57) ABSTRACT

Methods and apparatuses are provided which allow a receiving device to dynamically control and/or otherwise influence a sending device's decision regarding the level of error correction that is applied to streamed media. One method includes having the receiving device generate a request for streamed media that specifies an initial requested error correction level. In this manner, the receiving device is allowed to initially negotiate an error correction level with the sending device that will be providing the streamed media. The receiving device may also dynamically modify the requested level of error correction applied to the streaming media. The sending and receiving devices may also initially and/or dynamically negotiate different error correction encoding schemes. Different error encoding scheme(s) and/or error correction levels can also be selectively applied to different types of streamed media data.

111 Claims, 5 Drawing Sheets

NEGOTIATED/DYNAMIC ERROR CORRECTION FOR STREAMED MEDIA

TECHNICAL FIELD

The present invention relates generally to communication networks, and more particularly to methods and apparatuses that provide dynamic error correction for streamed media over wired and/or wireless connections/networks.

BACKGROUND

The Internet and other similar networks are currently being used to deliver streaming media from a server device to a client device. For example, audio and/or video content from news broadcasts can be streamed, from a server device/devices, through a network to one or more client devices.

The terms "streaming media" and "streamed media", as used herein, essentially mean real-time or near-real-time delivery of critical content (e.g., audio and/or video data) to a subscribing user's client device or devices. The client device/devices render the streamed media in a way that is appropriate for the client device and the media. By way of example, a live or previously recorded radio program can be transmitted as streamed audio data over a network to a wireless communication device, such as, e.g., a mobile telephone device, which then reproduces the audio signal.

To provide better service to the user, some networks that are used for streaming media are beginning to offer predictable levels of service. For example, in certain networks, an attempt is made to maintain both the throughput of the network connections (i.e., the data rate) and the errors introduced into data transmitted on those connections (i.e., the residual bit error rate or BER) within certain predicted limits, for the duration of a connection.

An example of such a network is the so-called "third generation" (3G) wireless network. 3G wireless networks are being designed to support high data rate wireless telephone services. Streaming content services are predicted to be major applications in these and other types of networks. Such services will be required to deal with certain levels of BER while maintaining an acceptable streaming content experience for subscribing users. As such, in many of these networks there is a need for error correction services that reduce the amount of corrupted data.

U.S. Pat. No. 6,141,788, issued to Rosenberg et al., provides a method for applying forward error correction (FEC) techniques in packet networks. FEC, which is a well-known error correction technique, provides a mechanism by which a sending device provides a receiving device with additional FEC data that can be subsequently used by the receiving device to detect and correct errors in received data. Thus, to support FEC the sending device typically includes an FEC encoder and the receiving device typically includes an FEC decoder. FEC allows for different levels of encoding. The different levels of encoding can be expressed by a density ratio based on the amount of FEC data generated for a given amount of data. Thus, for example, in certain systems the FEC encoding level may be "high" when there is a ratio of one FEC packet for every data packet. In other systems, the FEC encoding level may be "lower" such that there is a ratio of one FEC packet for every four data packets.

Rosenberg et al. disclose a method by which FEC packets may be forwarded from a sending device to one or more receiving devices. The receiving devices may or may not be configured to provide FEC decoding. For those receiving devices that can provide the requisite FEC decoding, Rosenberg et al., provide a way for the decoder to identify the level of FEC encoding from the header of an FEC packet, and thereafter complete the error correction process, as needed.

One of the drawbacks to the methods and apparatuses provided by Rosenberg et al., is that the sending device controls the level of FEC encoding independent of the receiving device(s). The receiving device(s) is simply advised as to the level of FEC encoding has been applied by the sending device. The receiving device is unable to influence the sending device's selection of the FEC encoding level.

It would be advantageous for a receiving device to be able to influence the sending device's decision, such that, for example, the receiving device can better adapt the density of error correction applied for a given location/time. Thus, there is a need for improved methods and apparatuses that allow a receiving device to control the level of encoding applied to streamed media by a sending device.

SUMMARY

In accordance with certain aspects of the present invention, methods and apparatuses are provided which allow a receiving device to dynamically control and/or otherwise influence a sending device's decision regarding the level of error correction that is applied to streamed media.

For example, in accordance with certain exemplary implementations of the present invention, a method is provided for use in a receiving device. The method includes generating a request for streamed media having an initial requested level of error correction provided therein. In this manner, the receiving device is allowed to request that a sending device provide a particular level of encoding for the streamed media. Moreover, in certain implementations, the method further includes having the receiving device dynamically modify the requested level of error correction applied to the streaming media.

BRIEF DESCRIPTION OF THE DRAWINGS

A more complete understanding of the various methods and apparatuses of the present invention may be had by reference to the following detailed description when taken in conjunction with the accompanying drawings wherein.

DETAILED DESCRIPTION

Figure 1:
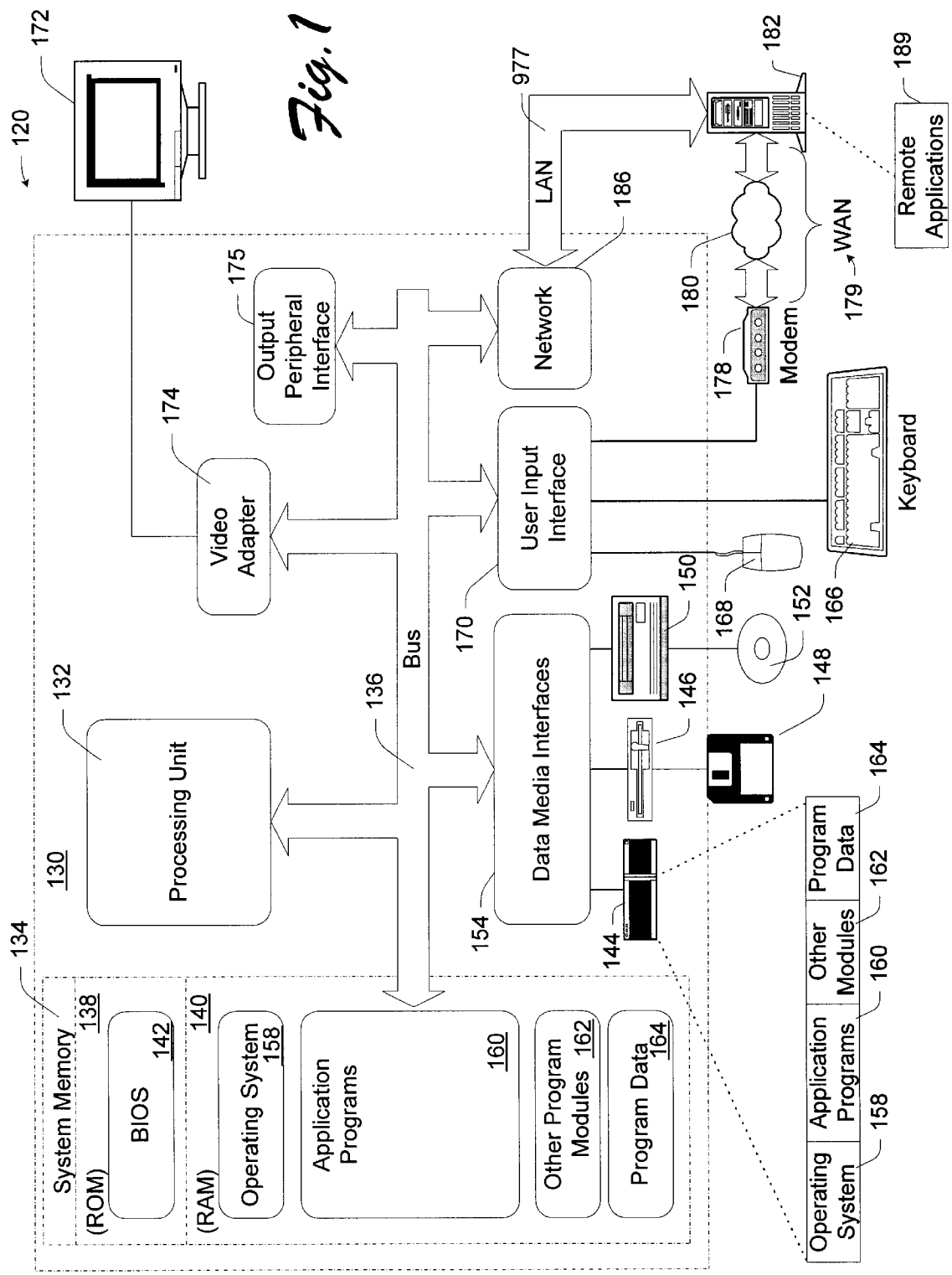
FIG. 1 is a block diagram depicting an exemplary device, in the form of a computer, which is suitable for use in providing, receiving, and/or otherwise communicating streamed media, in accordance with certain implementations of the present invention.

Turning to the drawings, wherein like reference numerals refer to like elements, the invention is illustrated as being implemented in a suitable computing environment. Although not required, portions of the invention are described in the general context of computer-executable instructions, such as program modules, being executed by a computer or like device, which, for example, may take the form of a personal computer (PC), a workstation, a portable computer, a server, a plurality of processors, a mainframe computer, a wireless communications base station, a handheld communications device, a streamed media player, a set-top box, etc.

Generally, program modules include routines, programs, objects, components, data structures, etc. that perform particular tasks or implement particular abstract data types. The various exemplary implementations of the present invention may also be practiced in distributed computing environments where tasks are performed by remote processing devices that are linked through a communications network. In a distributed computing environment, program modules may be located in both local and remote memory storage devices.

As provided herein, the term "logic" is meant to apply to any form of logic and requisite supporting elements, including, e.g., software, firmware, hardware, and/or any combination thereof.

FIG.1 illustrates an example of a suitable computing environment 120 on which portions of the subsequently described methods and apparatuses may be implemented.

Exemplary computing environment 120 is only one example of a suitable computing environment and is not intended to suggest any limitation as to the scope of use or functionality of the improved methods and apparatuses described herein. Neither should computing environment 120 be interpreted as having any dependency or requirement relating to any one or combination of components illustrated in computing environment 120.

The improved methods and apparatuses herein are operational with numerous other general purpose and/or special purpose computing system environments or configurations.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or nonvolatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and apparatuses described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
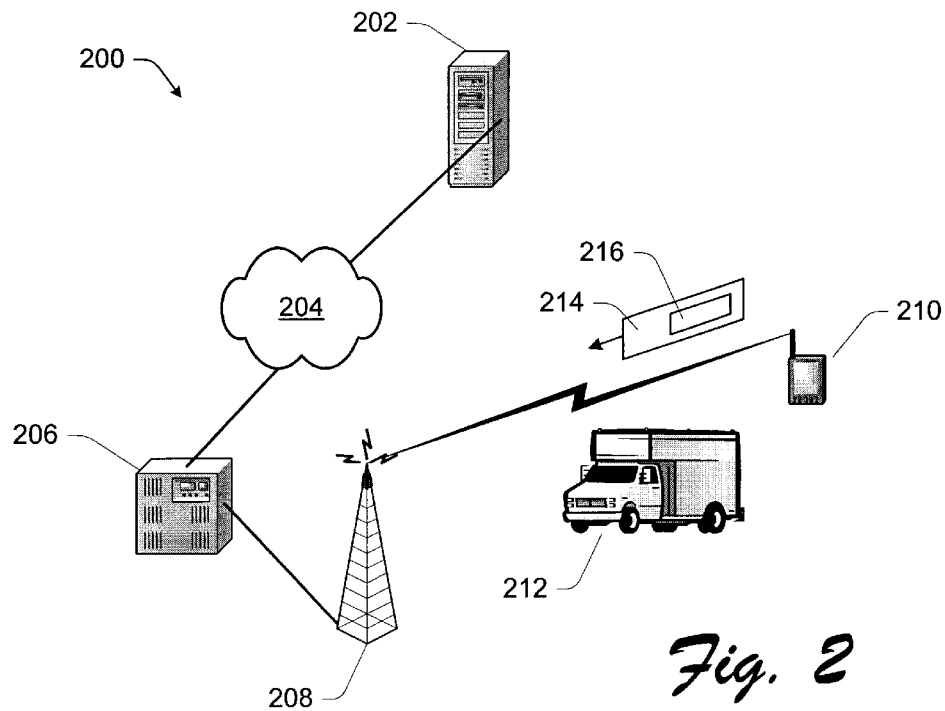
FIG. 2 is block diagram depicting an exemplary communication environment that includes a wireless communication link suitable for streaming media between a sending device and a receiving device, in accordance with certain implementations of the present invention.

Reference is now made to FIG. 2, which depicts an exemplary communications environment 200. Communications environment 200 includes a server 202 coupled to a network 204. Server 202, in this example, is configured as a sending device that provides streamed media over network 204. Network 204 is representative of one or more communication links/networks. In certain exemplary implementations network 204 includes the Internet, an intranet, or other like network.

A second server 206 is also shown as being coupled to network 204. Server 206, in this example, is configured as a sending device that can provide streaming media through an antenna 208 to a wireless receiving device 210. Thus, for example, server 206 may be co-located with a wireless base station. Server 206 may generate the streamed media itself, and/or may receive streamed media from server 202 and provide the streamed media to receiving device 210. In this example, the streamed media that is sent from server 206 to receiving device 210 has associated with it error correction data. The error correction data can be generated, for example, by server 202 and/or server 206.

In the examples that follow it will be assumed that server 206 is the sending device that is providing both the streamed media and generating the associated error correction data to receiving device 210, which is configured as a client device. It is noted, however, that the methods and apparatuses provided herein are adaptable for use in both wired and wireless environments.

Receiving device 210 is representative of any device capable of receiving streamed media over a wireless communication link. The wireless communication link, in this example, may be obstructed or otherwise interfered with by objects or other signals. For example, as illustrated in FIG. 2, an obstacle such as truck 212 may cause signal interference as it passes between antenna 208 and receiving device 210. Such signal interference can lead to errors in the received data, which can degrade the streamed media presentation if not corrected.

In accordance with certain aspects of the present invention, to correct the errors in the received data, server 206 and receiving device 210 are configured to support an improved error correction scheme. The improved error correction scheme essentially allows the sending device and receiving device to negotiate the level of error correction that is provided for the streamed media. The negotiation can be conducted at the beginning of the streaming media process and anytime thereafter.

Thus, with the improved error correction scheme it is possible to dynamically alter the error correction level as needed to overcome errors caused by different interference factors. For example, receiving device 210 may send a request message 214 identifying a requested error correction level 216. A higher error correction level may be requested when truck 212 is causing interference. However, once truck 212 has moved on, then receiving device 210 may request a lower error correction level.

In accordance with certain exemplary implementations of the present invention, request message 214 is a real time streaming protocol (RTSP) setup message. Here, for example, the requested error correction level 216 can indicate the density of error correction packets that are to be generated for a plurality of streaming media data packets. In certain implementations, for example, the density of error correction packets is specified along with the number of streaming media data packets within a span. Thus, when requesting the streamed media, receiving device 210 may request that the density of error correction packets be two per span, wherein each span includes four streaming media data packets. The sending device, here server 206, can either accept the request, propose a different error correction level, or override the requested error correction level. Hence, in this example, it is assumed that server 206 has decided to accept the requested error correction level 216. As such, server 206 will provide the requisite computing and data storage resources for the error correction data generation process. If at sometime during the streaming media session, server 206 can no longer provide such resources, then the error correction level provided can be reduced by server 206 as needed. As will be described, the error correction packets transmitted to receiving device 210 indicate the error correction level that the sending device (here, server 206) has applied. In this manner, the error correction level can be established, negotiated, and/or dynamically altered, as needed, by either the receiving device or the sending device.

Figure 3:
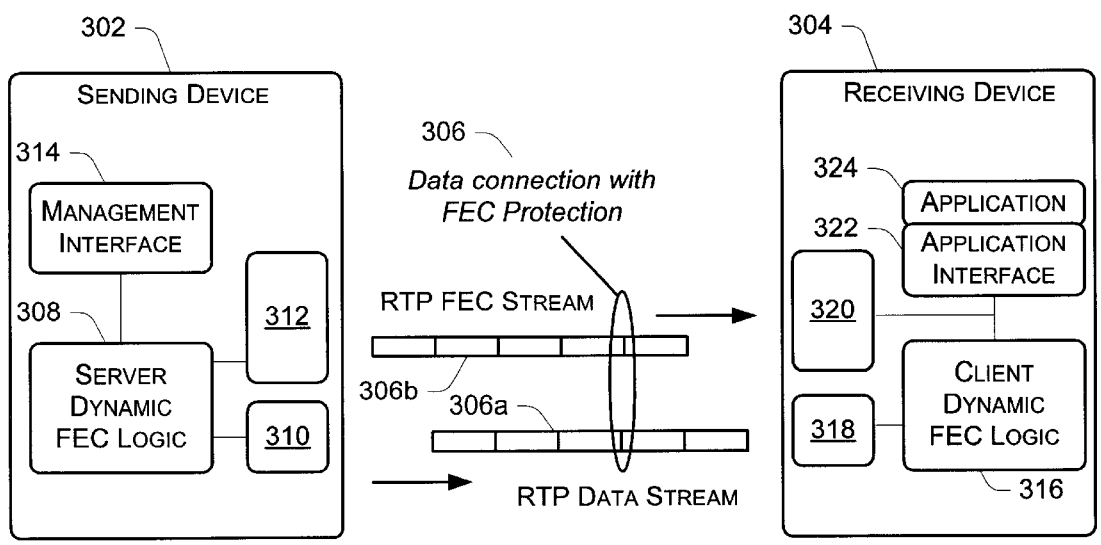
FIG. 3 is a block diagram depicting a sending device that is streaming media to a receiving device, for example, in the communication environment as in FIG. 2, in accordance with certain exemplary implementations of the present invention.

With this example in mind, attention is now drawn to FIG. 3, which depicts an exemplary streaming media arrangement 300, in accordance with certain implementations of the present invention. Here, a sending device 302 is streaming media to a receiving device 304. As shown, a data connection 306 is provided with forward error correction (FEC) protection. Data connection 306 includes a real-time transport protocol (RTP) data stream 306a and an associated RTP FEC data stream 306b. While, in this example, data streams 306a and 306b are distinct data streams, in other configurations these data streams can be interleaved into a single data stream.

Logic 308 is provided in sending device 302 to support the improved error correction scheme. In this example, logic 308 includes server dynamic FEC logic, which is configured to stream media, and encode (and stream) error correction data associated with the streamed media. Prior to streaming media, logic 308 provides receiving device 304 with information about the streaming media available. For example, in certain implementations an enhancement is provided to the standard session description protocol (SDP) elements that allows receiving device 304 to identify the location and characteristics of the streamed media and associated FEC data streams.

Once receiving device 304 has selected a streamed media, then receiving device 304 sends an RTSP setup message 214 (FIG. 2) to receiving device 302, wherein logic 308 responds by streaming media over data connection 306. As mentioned, sending device 302 may accept/support the requested error correction level 216, or some other error correction level as may be more appropriate given the situation. The resulting error correction level, however it is decided, is identified by logic 308 within RTP FEC stream 306b. For example, logic 308 can identify the density of error correction applied to a span of data packets within a header portion of an RTP message within one or more packets in RTP FEC stream 306b.

To support such tasks, logic 308 is operatively coupled to a communication interface 310, which includes a transmitter and a receiver (not shown) configured to support communications between sending device 302 and receiving device 304. Logic 312 is also operatively coupled to memory 312, which is configured to support the requisite buffering of media and/or error correction data for the improved error correction scheme. In this example, logic 308 is also operatively coupled to an optional management interface 314, which is arranged to configure certain operating parameters for logic 308. Thus, for example, management interface 314 may provide a user interface that allows a user to control/monitor logic 308. by way of example, the user may establish a minimum/maximum error correction level that logic 308 will provide.

Logic 308 operates with corresponding logic 316 provided within receiving device 304. In this example, logic 316 includes client dynamic FEC logic. Logic 316 is operatively coupled a communication interface 318, which configured to provide communication to sending device 302, e.g., via communication interface 310.

Logic 316 is configured to support the improved error correction scheme. As such, logic 316 is configured to use the received error correction data packets to correct errors in the received streamed media packets. In certain implementations, logic 316 is configured, therefore, to specify at any time the number of data packets (or span) to which a given number of FEC data packets will apply, and subsequently identify a received span and its associated received FEC data packets, reorder those data packets if necessary, and then apply error correction to any induced bit errors that are identified in the data. To support such tasks, logic 316 is also operatively coupled to memory 320, which is configured to support the requisite buffering of media and/or error correction data.

Logic 316 is also operatively coupled to an application interface 322, which provides communication between an application 324 and logic 316. Application 324, for example, can be a streamed media player/recorder. Logic 316 is configured to support the operation of application 324.

Figure 4:
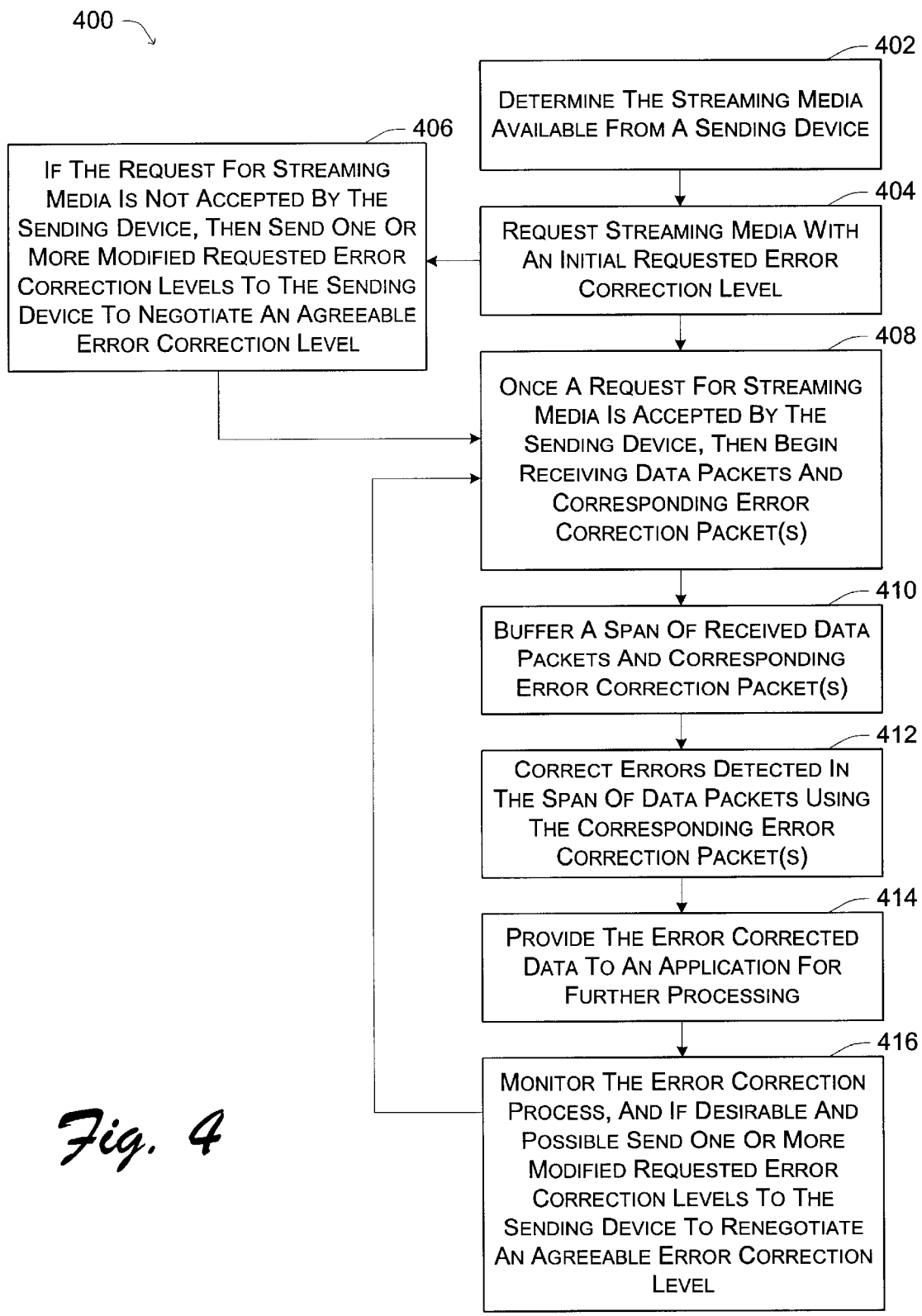
FIG. 4 is a flow diagram depicting a method for use in a receiving device, for example, as in FIG. 3, in accordance with certain exemplary implementations of the present invention.

With this in mind, reference is now made to the flow diagram in FIG. 4, which depicts an exemplary dynamic error correction process 400 for use in receiving device 304.

In step 402, receiving device 304 discovers and selects a streaming media available on sending device 302. Then in step 404, a request message 214 (FIG. 2) identifying a requested error correction level 216 (e.g., within an RTSP setup message) is sent to sending device 302.

Next, in step 406, if for some reason the sending device does not accept the request, then one or more additional requests, preferably with different requested error correction levels, are sent as needed until the sending device agrees to provide the requested streamed media. Process 400 then continues with step 408, wherein sending device 302 has accepted the request for streamed media. In step 408, receiving device 304 begins receiving streamed media data packets and corresponding FEC data packets. In step 410, at least one span of streamed media data packets is buffered/arranged along with one or more associated FEC packets. Here, the number of streamed media data packets in the span can be identified in the FEC data packet(s).

Next, in step 412, error correction is performed, as needed. For example, an FEC decoder operation is performed on the data in the span using the associated FEC data packet(s). In step 414, the error corrected streamed media data is provided through application interface 322 to application 324 (FIG. 3) for further processing.

In step 416, logic 316 monitors the streamed media process and if desirable negotiates a different error correction level. For example, a new request message 214 identifying a different requested error correction level 216 (e.g., within an RTSP setup message) can be sent to sending device 302. With or without a change to the requested error correction level, process 400 then returns to step 408. Thereafter, for the life of the streamed media connection, steps 408 through 416 are repeated.

Figure 5:
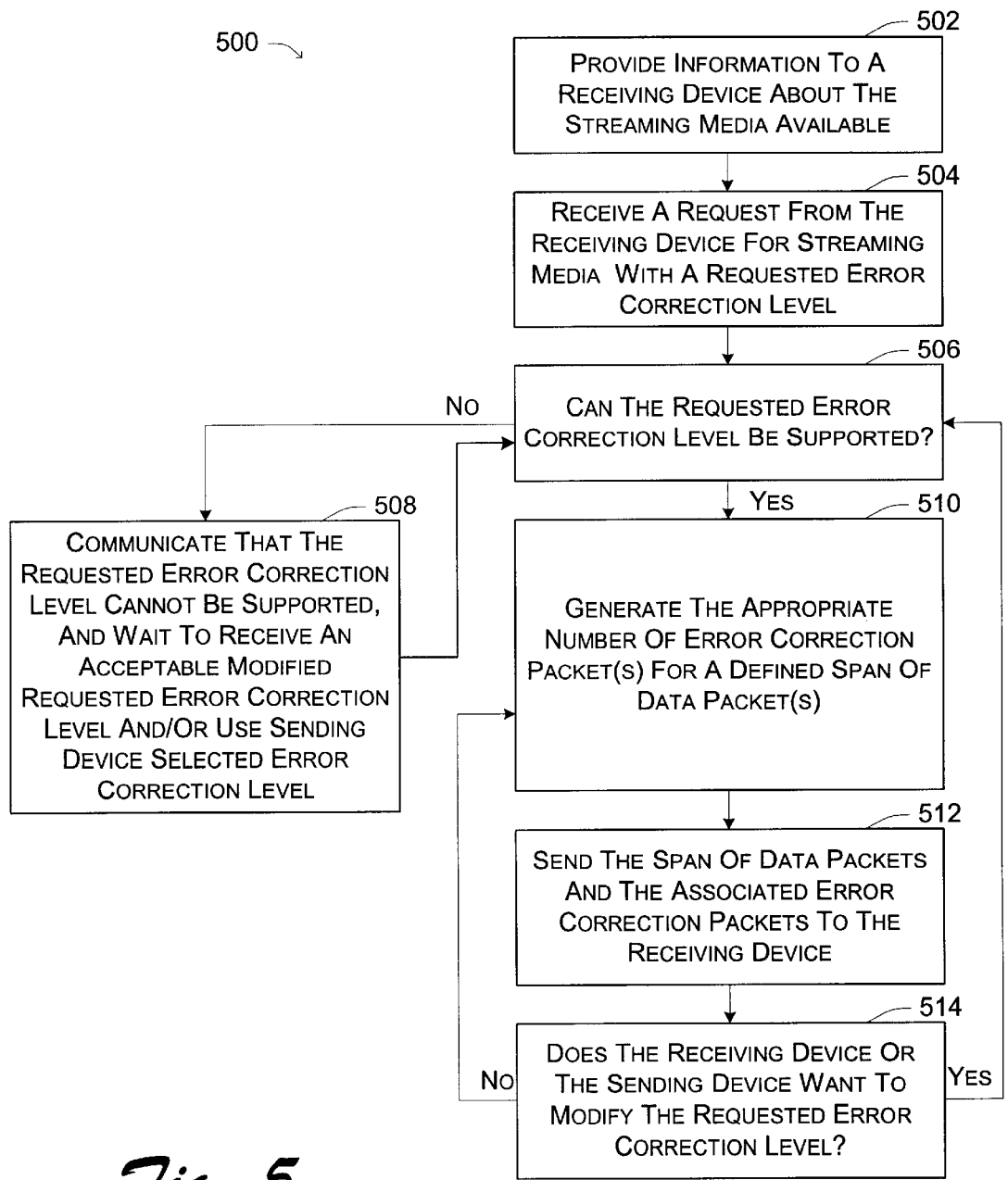
FIG. 5 is a flow diagram depicting a method for use in a sending device, for example, as in FIG. 3, in accordance with certain exemplary implementations of the present invention.

Attention is now drawn to FIG. 5, which depicts an exemplary dynamic error correction process 500 for use in sending device 302. In step 502, sending device 502 identifies the availability of streamed media to an inquiring receiving device. Next, in step 504 a request for streamed media is received. The request identifies an initial error correction level to be applied to a specified streamed media. For example, a request message 214 identifying a requested error correction level 216 (e.g., within an RTSP setup message) can be sent by receiving device 304 to sending device 302.

In step 506, a determination is made as to whether sending device 302 can support the requested error correction level. If the requested error correction level cannot be supported, then process 500 continues with step 508. In step 508, sending device 302 communicates (actively or passively) to receiving device 304, that the requested error correction level cannot be supported. Thereafter, sending device 302 waits for a new request message. This or a similar negotiation procedure continues until an acceptable error correction level is requested. Optionally, in certain implementations, sending device 302 may, at some point unilaterally adjust the error correction level to an acceptable level. For example, if there is need in the sending device to reduce the amount of processing/memory associated with an FEC data stream, then sending device 302 can make the necessary corresponding changes (e.g., reduction) to the error correction level.

Once the error correction level is acceptable, then process 500 continues with step 510, wherein sending device 302 generates the appropriate number of error correction data packet(s) for a defined span of one or more streamed media data packets. The span of streamed data packets may include a sequential span or non-sequential span of streamed media packets.

Next, in step 512, sending device 302 provides the span and associated error correction data packet(s) to receiving device 304. In step 514, if receiving device 304 has requested a different error correction level, then process 500 returns to step 506, otherwise process 500 returns to step 510. Steps 506 through 514 are repeated for the life of the streamed media connection.

Figure 6:
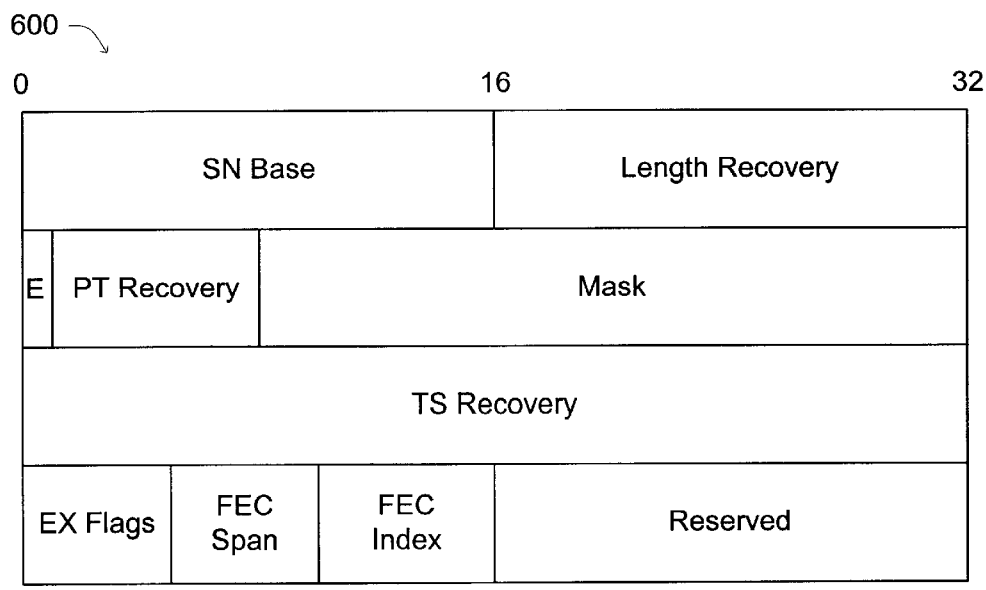
FIG. 6 is an illustrative diagram depicting a portion of a message format suitable for use in supporting the streaming of media between a sending device and a receiving device, for example, as in FIG. 3, in accordance with certain exemplary implementations of the present invention.

Reference is now made to FIG. 6, which illustratively depicts an extension 600 to an RTP message header that is suitable for use in an FEC data packet provided by sending device 302 to receiving device 304, in accordance with certain exemplary implementations of the present invention. Here, RTP message header 600 identifies the error correction level associated with the FEC data packet by specifying a Mask, an FEC Span, and an FEC Index. The Mask identifies the number of packets in the span associated with the FEC data packet. In this example, the Mask field is 24 bits. FEC Span identifies the number of FEC data packets associated with the span. Here, the FEC Span field is 5 bits. The FEC Index identifies the present FEC data packet's position within the FEC Span. Here, the FEC Index field is 6 bits.

Other fields included within exemplary extension 600, include a 16 bit packet Sequence Number (SN) Base field, a 16 bit Length Recovery field, a 1 bit Extended (E) flag field, a 7 bit Payload Type (PT) Recovery field, a 32 bit media packet Timestamp (TS) Recovery field, a 5 bit EX Flags field, and a 16 bit Reserved field.

The SN Base field is set to the minimum sequence number of those media packets on this streaming connection that are to be protected by FEC. This allows for the FEC operation to extend over a string of packets. The Length Recovery field is used to determine the length of any recovered packets. It is computed via the protection operation applied to the 16 bit natural binary representation of the payload length (in bytes). The payload length includes the media payload itself, as well as additional overhead for the CSRC list, extension and padding of the media packet or packets associated with this FEC packet. This field allows for the FEC procedure to be applied even when the lengths of the media packets streamed on a connection vary. For example, assume an FEC packet is being generated by XOR'ing two media packets together. The length of the two media packets are 3 (0b011) and 5 (0b101) bytes, respectively. The length recovery field is then encoded as 0b011 XOR 0b101=0b100.

The E flag indicates a header extension. PT indicates Payload Type for the media packet payload. The PT recovery field is obtained via the protection operation applied to the payload type values of the media packets associated with the FEC data packet. The Mask field is 24 bits, and identifies the media packet associated with the FEC data packet. If bit i in the mask is set to 1, then the media packet with sequence number N+i is associated with the FEC data packet, where N is the SN Base field in the FEC packet header. The least significant bit corresponds to i=0, and since, in this example, there can be at most 24 packets in a sequence of FEC protected streamed media packets, the most significant bit corresponds to i=23.

The TS recovery field is computed via the protection operation applied to the timestamps of the streamed media packets associated with the FEC data packet. This allows the timestamp to be completely recovered. The EX Flags and the Reserved fields are each reserved for future use.

The following sections focus on some exemplary message exchanges using the above methods and apparatuses.

The excerpts below are from an SDP content description that is sent by sending device 302 to receiving device 302 in response to a DESCRIBE request. The SDP description indicates the path for the content file, and URLs for audio and video streams, as well as associated standard and dynamic FEC streams.

v=0
o=SYSTEM 2001032617414702 00 2001032617414770200
IN IP4 127.0.0.1
s=<No Title>
c=IN 1P4 0.0.0.0
b=AS:5
a=maxps:900
t=0.0
a=control:rtsp://test/welcome.asf/ //the absolute URL for this media stream
a=etag:{6CAE8AA4-1866-A24D-344E-3CF22C3894A7}
a=range:npt=0.000-110.474
a=recvonly
a:pgmpu:data:application/x-wms-contentdesc, Copied%20MetaData%20From%20Playlist%20File=1%0D%0 A
:
m=audio 0 RTP/AVP 96 97 98
b=AS:7
b=RS:0
b=RR:0
a=rtpmap:96 x-asf-pf/10000
a=rtpmap:97 parityfec/1000
a=fmtp:97 audio/fec97 24 1
a=rtpmap:98 wms-fec/1000
a=fmtp:98 audio/fec98 24 1 //the relative URL For this media stream's associated dynamic FEC stream
a=control:audio
a=stream:1
m=application 0 RTP/AVP 96
b=RS:0
b=RR:0
a=rtpmap:96 x-wms-rtx/1000
a=control:rtx
a=stream:65536
m=video 0 RTP/AVP 96 97 98
b=AS:45
b=RS:0
b=RR:0
a=rtpmap:96 x-asf-pf/1000
a=rtpmap:97 parityfec/1000
a=fmtp:97 video/fec97 24 1
a=rtpmap:98 wms-fec/1000
a=fmtp:98 video/fec98 24 1
a=control:video
a=stream:2

The following lines identify a dynamic error correction level payload format and the URL that is to be used for a FEC Stream corresponding to this format:

a=rtpmap:98 wms-fec/1000 //Windows® Media Services FEC payload format 98
a=fmtp:98 audio/fec98 24 1 //the relative URL For this media stream's associated dynamic FEC stream using this payload format In this example, receiving device 304 appends the relative URL to the absolute URL for the media stream in order to arrive at:

rtsp://test/welcome.asf/audio/fec98  24  1 as the URL for the associated FEC connection for streamed media at rtsp://test/welcome.asf. The FEC URL description includes the FEC Span—the number of data packets to which a particular FEC data packet or set of FEC data packets will apply—and the number of FEC data packets that apply to this span:

a=fmtp:98 audio/fec98  24  1  // span=24, FEC packets per span=1

From this, receiving device 304 is able to select, for example, audio and/or video streams and for each of those it can select associated FEC streams that are encoded according to standard FEC or according to dynamic FEC. In the case of dynamic FEC, in this example, a request/response exchange between sending device 302 and receiving device 304 occurs whereby sending device 302 agrees to the receiving device's SETUP request to play a stream of dynamic FEC data packets, using a packet span of 24 and 4 FEC data packets per span. Here, an FecBurstMargin is used to buffer a set of packet spans and associated FEC packets in the form of a Vandermonde matrix, which includes calculations commonly applied to error correction problems.

SETUP rtsp://test/welcome2.asf/stream=5/fec98 RTSP/1.0

Transport: RTP/AVP/UDP;unicast;client_port=2408;ssrc=6dded651;mode=PLAY;Fec Span=4;FecPerSpan=1;FecBurstMargin=6, RTP/AVP/TCP;unicast;interleaved=0-1;ssrc=6dded651;mode=PLAY If-Match: "{83A04BD0-FD30-1984-4994-0A22CA116ED3}"

Date: Fri, 23 Mar 2001  04:28:14 GMT

CSeq: 8

Session: 1077055954

User-Agent: WMPlayer/9.0.0.197 guid/CB131790-CC16-4CCE-A234-6D29BEE21FCE

Accept-Language: en-us, *;q=0.1

Accept-Charset: UTF-8, *;q=0.1

X-Accept-Authentication: NTLM, Digest, B

RTSP/1.0  200 OK

Transport: RTP/AVP/UDP;unicast;source=157.56.216.159;server_port=2410;client_p ort=2408;ssrc=3874dd27;mode=PLAY;FecSpan=4;FecPerSpan=1;FecBurs tMargin=6

Date: Fri, 23 Mar 2001  04:28:14 GMT

CSeq: 8

Timestamp: 1  0.031

Session: 1077055954;timeout=60

Server: WMServer/9.0.0.197

Cache-Control: must-revalidate, proxy-revalidate

In the following example receiving device 304 establishes an initial FEC density of 4:2. The RTSP setup message includes:

SETUP rtsp://test/welcome2.asf/stream=5/fec98 RTSP/1.0

Transport: RTP/AVP/UDP;unicast;client_port=2408;ssrc=6dded651;mode=PLAY;Fec Span=4;FecPerSpan=2;

Sending device 302 responds with success:

RTSP/1.0  200 OK

Transport: RTP/AVP/UDP;unicast;source=157.56.216.159;server_port=2410;client_p ort=2408;ssrc=3874dd27;

Thereafter, receiving device 304 will receive streamed media and associated FEC data packets from sending device 302, with each FEC data packet using RTP header extension 600.

Figure 7:
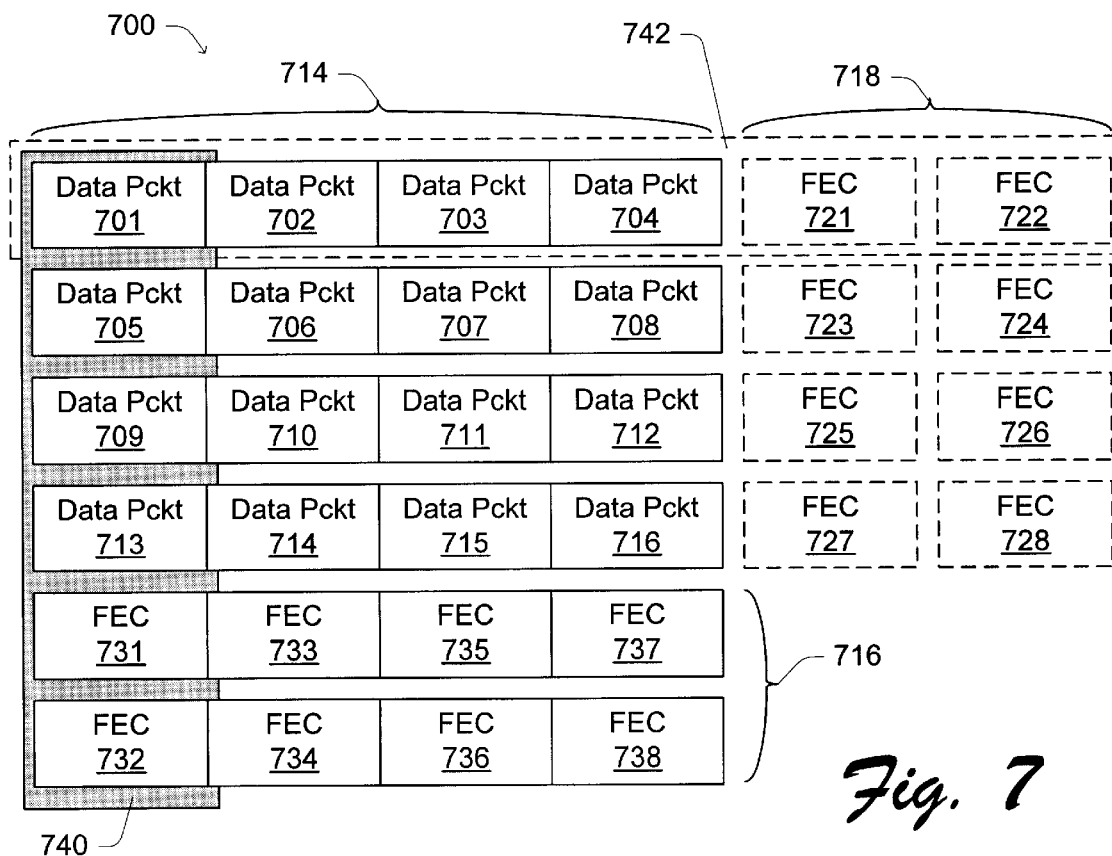
FIG. 7 is an illustrative diagram depicting two exemplary techniques for use in applying error correction to a matrix of data packets, in accordance with certain exemplary implementations of the present invention.

Attention is now drawn to the illustrative diagram depicted in FIG. 7, wherein an arrangement 700 is shown having a 4×4 matrix of media data packets (701 through 716) and two alternative associated FEC data packet sets 716 and 718. FEC data packet set 716 includes FEC data packets 731 through 738, and FEC data packet set 718 includes FEC data packets 721 through 728. Arrangement 700 illustrates that FEC encoding can be applied to sequential streamed media data packets or non-sequential data packets. Here, for example, as represented by shaded region 742, FEC encoding can be applied to sequential data packets 701–704 to produce associated FEC data packets 721 and 722. Alternatively, as represented by shaded region 740, FEC encoding can be applied to non-sequential data packets 701, 705, 709, and 713, to produce associated FEC data packets 731 and 732. Note that the error correction density in both instances is 4:2.

In certain implementations, it is advantageous to encode non-sequential data packets, since doing so may reduce the deleterious effects of burst errors commonly experienced in certain wireless links. However, such non-sequential encoding requires more memory (in both sending device 302 and receiving device 304) than comparable sequential encoding.

In accordance with certain implementations of the present invention, logic 308 and logic 316 (FIG. 3) are further configured to selectively/dynamically switch between sequential and non-sequential encoding. Thus, for example, receiving device 304 and sending device 302 may initially/dynamically negotiate to use a particular type of error correction encoding. This additional capability may be used to further improve the streamed media process.

In accordance with certain other implementations of the present invention, logic 308 and logic 316 may be further configured to selectively/dynamically apply error correction encoding to the streamed media based on the content of the streamed media. By way of example, different error correction encoding can be applied to video content and audio content.

In certain further implementations, for example, different error correction encoding can be applied to different portions of a streamed video. Thus, in a news broadcast, inserted commercial portions may be error correction encoded at a different level than the news portions. In accordance with still other implementations, different error correction encoding can be applied to streamed media data packets carrying different types of video frame data. For example, in an MPEG stream, a data packet with I-frame data may be error correction encoded at a higher level than a data packet with P-frame data.

Although some preferred implementations of the various methods and apparatuses of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A method for use in a receiving device, the method comprising:
    identifying a sending device configurable to provide streamed media with dynamic error correction;
    generating a request for the streamed media that identifies a requested error correction level; and
    providing the request for the streamed media to the sending device.

2. The method as recited in claim 1, further comprising:
    subsequently dynamically modifying the requested error correction level; and
    providing the modified requested error correction level to the sending device.

3. The method as recited in claim 1, wherein providing the request for the streamed media to the sending device includes:
    sending a real time streaming protocol (RTSP) setup message to the sending device.

4. The method as recited in claim 1, wherein providing the request for the streamed media to the sending device includes transmitting the request for the streamed media over at least one wireless communication link.

5. The method as recited in claim 1, wherein the receiving device is a client device and the sending device is a server device.

6. The method as recited in claim 1, wherein generating the request for the streamed media includes identifying the requested error correction level by specifying a requested error correction data density.

7. The method as recited in claim 6, wherein specifying the requested error correction data density includes:
    identifying a number of streamed data packets within a span; and
    identifying a number of error correction data packets associated with the span.

8. The method as recited in claim 7, wherein the number of streamed data packets within the span is between about 1 and about 24, and wherein the number of error correction data packets associated with the span is between about 1 and about 24.

9. The method as recited in claim 1, further comprising:
    receiving streamed data packets and error correction data packets sent by the sending device;
    associating a span, comprising a plurality of the received streamed data packets, with at least one of the received error correction data packets; and
    correcting errors in the span, as needed, using the at least one of the received error correction data packets.

10. The method as recited in claim 9, wherein the span includes a plurality of sequential streamed data packets.

11. The method as recited in claim 9, wherein the span includes a plurality of non-sequential streamed data packets.

12. The method as recited in claim 9, further comprising:
    selectively requesting that the sending device generate the at least one of the error correction data packets based on the span comprising streamed data packets that are sequential.

13. The method as recited in claim 9, further comprising:
    selectively requesting that the sending device generate the at least one of the error correction data packets based on the span comprising streamed data packets that are non-sequential.

14. The method as recited in claim 9, wherein the error correction data packets include forward error correction (FEC) generated error correction data.

15. The method as recited in claim 9, wherein associating the span with the at least one of the received error correction data packets includes:
    examining a packet header within the at least one of the received error correction data packets to determine:
        the plurality of the received data packets within the span; and
        a position parameter for the at least one of the received error correction data packets within an error correction data packet sequence associated with the span.

16. The method as recited in claim 15, wherein the packet header includes an extended real-time transport protocol (RTP) header.

17. An apparatus for use in a receiving device, the apparatus comprising:
    a receiver operatively configurable to receive streamed media from a sending device;
    a transmitter operatively configurable to output requests for the streamed media; and
    logic operatively coupled to the receiver and the transmitter, the logic being configured to generate a request for the streamed media that specifies a requested error correction level and provide the request to the transmitter.

18. The apparatus as recited in claim 17, wherein the logic is further operatively configured to subsequently dynamically modify the requested error correction level.

19. The apparatus as recited in claim 17, wherein the transmitter is configured to provide the request within a real time streaming protocol (RTSP) setup message.

20. The apparatus as recited in claim 17, wherein the receiver and the transmitter are configured to receive and transmit, respectively, over at least one wireless communication link.

21. The apparatus as recited in claim 17, wherein the receiving device is a client device and the sending device is a server device.

22. The apparatus as recited in claim 17, wherein the logic is further configured to identify the requested error correction level by specifying a requested error correction data density.

23. The apparatus as recited in claim 22, wherein the requested error correction data density identifier includes a specified number of streamed data packets within a span and a specified number of error correction data packets associated with the span.

24. The apparatus as recited in claim 23, wherein the specified number of streamed data packets within the span is between about 1 and about 24, and wherein the specified number of error correction data packets associated with the span is between about 1 and about 24.

25. The apparatus as recited in claim 17, wherein the logic is further configured to associate a span, comprising a plurality of received streamed data packets, with at least one received error correction data packet as provided by the receiver, and correct errors in the span, as needed, using the at least one received error correction data packet.

26. The apparatus as recited in claim 25, wherein the span includes a plurality of sequential streamed data packets.

27. The apparatus as recited in claim 25, wherein the span includes a plurality of non-sequential streamed data packets.

28. The apparatus as recited in claim 25, wherein the logic is further configured to selectively request that the sending device generate the at least one of the error correction data packets based on the span comprising streamed data packets that are sequential.

29. The apparatus as recited in claim 25, wherein the logic is further configured to selectively request that the sending device generate the at least one of the error correction data packets based on the span comprising streamed data packets that are non-sequential.

30. The apparatus as recited in claim 25, wherein the error correction data packets include forward error correction (FEC) generated error correction data.

31. The apparatus as recited in claim 25, wherein the logic is further configured to examine a packet header within the at least one received error correction data packet to determine the plurality of the received data packets within the span and a position parameter for the at least one received error correction data packets within an error correction data packet sequence associated with the span.

32. The apparatus as recited in claim 31, wherein the packet header includes an extended real-time transport protocol (RTP) header.

33. A computer-readable medium comprising computer-executable instructions for:
identifying a sending device configurable to provide streamed media with dynamic error correction;
generating a request for the streamed media that identifies a requested error correction level; and
providing the request for the streamed media to the sending device.

34. The computer-readable medium as recited in claim 33, further comprising computer-executable instructions for:
subsequently dynamically modifying the requested error correction level; and
providing the modified requested error correction level to the sending device.

35. The computer-readable medium as recited in claim 33, wherein generating the request for the streamed media includes identifying the requested error correction level by specifying a requested error correction data density.

36. The computer-readable medium as recited in claim 33, wherein specifying the requested error correction data density includes identifying a number of streamed data packets within a span, and a number of error correction data packets associated with the span.

37. The computer-readable medium as recited in claim 33, wherein providing the request for the streamed media to the sending device includes:
sending a real time streaming protocol (RTSP) setup message to the sending device.

38. The computer-readable medium as recited in claim 33, wherein the request for streamed media is further configured for transmission over at least one wireless communication link.

39. The computer-readable medium as recited in claim 33, wherein the receiving device is a client device and the sending device is a server device.

40. The computer-readable medium as recited in claim 33, further comprising computer-executable instructions for:
associating a span, comprising a plurality of received streamed data packets, with at least one received error correction data packet; and
correcting errors in the span, as needed, using the at least one of the received error correction data packets.

41. The computer-readable medium as recited in claim 40, wherein the span includes a plurality of sequential streamed data packets.

42. The computer-readable medium as recited in claim 40, wherein the span includes a plurality of non-sequential streamed data packets.

43. The computer-readable medium as recited in claim 40, further comprising computer-executable instructions for:
selectively requesting that the sending device generate the at least one of the error correction data packets based on the span comprising streamed data packets that are sequential.

44. The computer-readable medium as recited in claim 40, further comprising computer-executable instructions for:
selectively requesting that the sending device generate the at least one of the error correction data packets based on the span comprising streamed data packets that are non-sequential.

45. The computer-readable medium as recited in claim 40, wherein the error correction data packets include forward error correction (FEC) generated error correction data.

46. The computer-readable medium as recited in claim 40, wherein associating the span with the at least one received error correction data packet includes:
examining a packet header within the at least one received error correction data packet to determine the plurality of the received data packets within the span, and a position parameter for the at least one received error correction data packet within an error correction data packet sequence associated with the span.

47. The computer-readable medium as recited in claim 46, wherein the packet header includes an extended real-time transport protocol (RTP) header.

48. A method for use in a sending device configured to provide streamed media to a receiving device, the method comprising:
receiving a request for streamed media from the receiving device, the request for streamed media having a requested error correction level;
in response, generating at least one error correction data packet associated with a span of data packets to be streamed in accordance with the requested error correction level; and
outputting the span of data packets and the at least one error correction data packet.

49. The method as recited in claim 48, further comprising:
subsequently receiving a dynamically modified requested error correction level; and
in response, generating at least one error correction data packet associated with a span of data packets to be streamed in accordance with the modified requested error correction level.

50. The method as recited in claim 48, further comprising:
selectively overriding the received requested error correction level.

51. The method as recited in claim 48, wherein the received request for streamed media is included in a real time streaming protocol (RTSP) setup message.

52. The method as recited in claim 48, wherein outputting the at least one error correction data packet the packet includes generating an extended real-time transport protocol (RTP) header.

53. The method as recited in claim 48, wherein the request for streamed media is received over a wireless communication link and the data packets within the span and the at least one error correction data packet are configured for transmission over the wireless communication link.

54. The method as recited in claim 48, wherein the sending device includes a server device and the receiving device includes a client device.

55. The method as recited in claim 48, wherein the error correction data packet includes forward error control (FEC) generated data.

56. The method as recited in claim 48, wherein the request for the streamed media identifies the requested error correction level by specifying a requested error correction data density.

57. The method as recited in claim 56, wherein the requested error correction data density identifies a number of streamed data packets to be included within the span, and a number of error correction data packets to be associated with the span.

58. The method as recited in claim 48, wherein generating the at least one error correction data packet associated with the span of data packets to be streamed in accordance with the requested error correction level includes generating the span for a plurality of sequential data packets.

59. The method as recited in claim 58, further comprising:
receiving a request from the receiving device to generate the at least one of the error correction data packets based on the span comprising data packets that are sequential.

60. The method as recited in claim 48, wherein generating the at least one error correction data packet associated with the span of data packets to be streamed in accordance with the requested error correction level includes generating the span for a plurality of non-sequential data packets.

61. The method as recited in claim 60, further comprising:
receiving a request from the receiving device to generate the at least one of the error correction data packets based on the span comprising data packets that are non-sequential.

62. The method as recited in claim 48, wherein generating the at least one error correction data packet associated with the span of data packets to be streamed in accordance with the requested error correction level includes:
selectively generating the at least one error correction data packet associated with the span of data packets to be streamed based on content within the data packets to be streamed, such that a first error correction level is applied to a first type of content and a different second error correction level is applied to a second type of content.

63. The method as recited in claim 62, wherein the first type of content includes audio content and the second type of content includes video content.

64. The method as recited in claim 62, wherein the first type of content includes a first type of video content and the second type of content includes a second type of video content.

65. The method as recited in claim 64, wherein the first type of video content includes I-frame video content and the second type of video content includes P-frame video content.

66. The method as recited in claim 64, wherein the first type of video content includes video content associated with a first program and the second type of video content includes video content associated with an appended second program.

67. The method as recited in claim 66, wherein the video content associated with an appended second program includes advertising content.

68. An apparatus for use in a sending device capable of streaming media to a receiving device, the apparatus comprising:
a receiver configurable to receive a request for streamed media from the receiving device, the request for streamed media having a requested error correction level;
logic operatively coupled to the receiver and configured to generate at least one error correction data packet associated with a span of data packets to be streamed in accordance with the received requested error correction level; and
a transmitter operatively coupled to the logic and configurable to transmit the span of data packets and the at least one error correction data packet to the receiving device.

69. The apparatus as recited in claim 68, wherein:
the receiver is further configured to receive a modified requested error correction level; and
in response, the logic is further configured to generate at least one error correction data packet associated with a span of data packets to be streamed in accordance with the modified requested error correction level.

70. The apparatus as recited in claim 68, wherein the logic is further configured to selectively override the received requested error correction data density identifier.

71. The apparatus as recited in claim 68, wherein the receiver receives the request for streamed media in a real time streaming protocol (RTSP) setup message.

72. The apparatus as recited in claim 68, wherein the transmitter transmits the at least one error correction data packet using an extended real-time transport protocol (RTP) header.

73. The apparatus as recited in claim 68, wherein the receiver is a wireless receiver and the transmitter is a wireless transmitter.

74. The apparatus as recited in claim 68, wherein the span includes a plurality of sequential data packets.

75. The apparatus as recited in claim 68, wherein span includes a plurality of non-sequential data packets.

76. The apparatus as recited in claim 68, wherein the sending device includes a server device and the receiving device includes a client device.

77. The apparatus as recited in claim 68, wherein the error correction data packet includes forward error control (FEC) generated data.

78. The apparatus as recited in claim 68, wherein the request for the streamed media identifies the requested error correction level by specifying a requested error correction data density.

79. The apparatus as recited in claim 78, wherein the requested error correction data density identifies a number of streamed data packets to be included within the span, and a number of error correction data packets to be associated with the span.

80. The apparatus as recited in claim 68, wherein the logic is further configured to selectively generate the at least one error correction data packet associated with the span of data packets to be streamed based on content within the data packets to be streamed, such that a first error correction level is applied to a first type of content and a different second error correction level is applied to a second type of content.

81. The apparatus as recited in claim 80, wherein the first type of content includes audio content and the second type of content includes video content.

82. The apparatus as recited in claim 80, wherein the first type of content includes a first type of video content and the second type of content includes a second type of video content.

83. The apparatus as recited in claim 82, wherein the first type of video content includes I-frame video content and the second type of video content includes P-frame video content.

84. The apparatus as recited in claim 82, wherein the first type of video content includes video content associated with a first program and the second type of video content includes video content associated with an appended second program.

85. The apparatus as recited in claim 84, wherein the video content associated with an appended second program includes advertising content.

86. A computer-readable medium comprising computer-executable instructions for:

in response to a received request for streamed media from a receiving device, the request for streamed media having a requested forward error level, generating at least one error correction data packet associated with a span of data packets to be streamed in accordance with the requested error correction data density identifier; and causing the span of data packets and the at least one error correction data packet to be output.

87. The computer-readable medium as recited in claim 86, further comprising computer-executable instructions for:

in response to a subsequently received modified requested error correction level, generating at least one error correction data packet associated with a span of data packets to be streamed in accordance with the modified requested error correction level.

88. The computer-readable medium as recited in claim 86, further comprising computer-executable instructions for:

selectively overriding the received requested error correction level.

89. The computer-readable medium as recited in claim 86, wherein the received request for streamed media is included in a real time streaming protocol (RTSP) setup message.

90. The computer-readable medium as recited in claim 86, wherein the span of data packets and the at least one error correction data packet are output using an extended real-time transport protocol (RTP) header.

91. The computer-readable medium as recited in claim 86, wherein causing the span of data packets and the at least one error correction data packet to be output includes causing the span of data packets and the at least one error correction data packet to be provided to a wireless transmitter.

92. The computer-readable medium as recited in claim 86, wherein the request for the streamed media identifies the requested error correction level by specifying a requested error correction data density.

93. The computer-readable medium as recited in claim 92, wherein the requested error correction data density identifies a number of streamed data packets to be included within the span, and a number of error correction data packets to be associated with the span.

94. A system comprising:

a network;

a first device operatively coupled to the network and configured to output a request for streamed media over the network and receive streamed media over the network, the request for streamed media comprising a requested forward error correction level; and a second device operatively coupled to the network and configured to receive the request for streamed media over the network and in response generate at least one error correction data packet associated with a span of data packets to be streamed in accordance with the received requested error correction level, and output the at least one error correction data packet and the span of data packets over the network to the first device.

95. The system as recited in claim 94, wherein the first device includes a client device and the second device includes a server device.

96. The system as recited in claim 94, wherein the first device includes a mobile communication device and the second device includes a base station.

97. The system as recited in claim 94, wherein the first device is further configured to dynamically modify the requested error correction level for subsequently received streamed media.

98. The system as recited in claim 94, wherein the requested error correction level includes a specified number of streamed data packets within a span and a specified number of error correction data packets associated with the span.

99. The system as recited in claim 94, wherein the first device outputs the request for streamed media within a real time streaming protocol (RTSP) setup message.

100. The system as recited in claim 94, wherein the second device is further configured to receive a modified requested error correction level and, in response, generate at least one error correction data packet associated with a span of data packets to be subsequently streamed in accordance with the modified requested error correction level.

101. The system as recited in claim 94, wherein the second device is further configured to selectively override the received requested error correction level.

102. The system as recited in claim 94, wherein the network includes at least one wireless communication link.

103. The system as recited in claim 94, wherein the first device and the second device are configured to dynamically negotiate the error correction level.

104. The system as recited in claim 94, wherein the first device is further configured, upon receipt, to associate the span with the at least one error correction data packet and correct errors in the span, as needed, using the at least one received error correction data packet.

105. The system as recited in claim 104, wherein the first device is further configured to examine a packet header within the at least one received error correction data packet to determine the plurality of the received data packets within the span and a position parameter for the at least one received error correction data packet within an error correction data packet sequence associated with the span.

106. The system as recited in claim 105, wherein the packet header includes an extended real-time transport protocol (RTP) header.

107. A computer-readable medium having stored thereon a data structure, comprising:

at least one parameter requesting streamed media;

at least one parameter identifying the requested streamed media; and at least one parameter establishing a receiving device requested error correction level to be applied by a sending device when providing the requested streamed media.

108. The computer-readable medium as recited in claim 107, wherein the at least one parameter establishing the client device requested error correction level identifies a specified number of streamed data packets within a span and a specified number of error correction data packets associated with the span.

109. The computer-readable medium as recited in claim 107, wherein the receiving device requested error correction level is dynamically set.

110. The computer-readable medium as recited in claim 107, wherein the data structure is part of a real time streaming protocol (RTSP) formatted message.

111. A computer-readable medium having stored thereon a data structure, comprising:
- an error correction packet extended real-time transport protocol (RTP) header having:
  - a first parameter identifying a number of streamed data packets within a span;
  - a second parameter identifying a specified number of error correction data packets associated with the span; and
  - a third parameter identifying a sequence number of the error correction data packet with respect to the specified number of error correction data packets associated with the span.

* * * * *